United States Patent [19]

Matsuyama

[11] Patent Number: 4,800,456
[45] Date of Patent: Jan. 24, 1989

[54] MAGNETIC DISK DEVICE WITH COMPONENT MATERIALS HAVING IMPROVED SILICON CONTENT

[75] Inventor: Jiro Matsuyama, Hyogo, Japan
[73] Assignee: Mitsubishi Denki Kabushiki Kaisha, Tokyo, Japan
[21] Appl. No.: 126,374
[22] Filed: Nov. 30, 1987
[30] Foreign Application Priority Data
  Nov. 28, 1986 [JP] Japan .................. 61-284643
[51] Int. Cl.$^4$ .................................. G11B 5/56
[52] U.S. Cl. ................................. 360/109; 360/75; 360/99.08
[58] Field of Search ............... 360/106, 102, 104–105, 360/109, 97–99, 75, 77

[56] References Cited
U.S. PATENT DOCUMENTS
4,071,866 1/1978 Butsch .................. 360/106
4,133,015 1/1979 Butsch .................. 360/109
4,638,383 1/1987 McGinlay et al. .......... 360/77

Primary Examiner—John H. Wolff
Attorney, Agent, or Firm—Sughrue, Mion, Zinn, Macpeak & Seas

[57] ABSTRACT

A magnetic disk device comprising a box-shaped base; a spindle motor attached to the upper plate of the base to rotate a magnetic disk through the action of a hub; a swing arm rotatably supported at one end thereof on a pivot attached to the upper plate of the base; a magnetic head supported at the tip of the swing arm so as to be positioned over the data track of the magnetic disk; a capstan which is rotated by a step motor attached to the upper plate of the base; and a band wound on said capstan and coupled at one end of the band to the swing arm so as to turn the swing arm through the rotation of the capstan, characterized in that the swing arm is made of an aluminum alloy whose silicon content is 16±1% by weight; and the base is made of a die-cast aluminum alloy whose silicon content is 7.5 to 9.5% by weight.

1 Claim, 2 Drawing Sheets

MAGNETIC DISK DEVICE WITH COMPONENT MATERIALS HAVING IMPROVED SILICON CONTENT

BACKGROUND OF THE INVENTION

The present invention relates to a magnetic disk device for rotating a magnetic disk to record and reproduce information through a magnetic head, and particularly relates to the improvement that the quantity of the deviation between the magnetic head and the data track of the magnetic disk is reduced.

FIG. 4 shows a plan view of a conventional magnetic disk device disclosed in Japanese Utility Model Application (OPI) No. 76569/86 (the term "OPI" as used herein means an "unexamined published application"). Shown at 1 in FIG. 4 is a magnetic disk fitted on a hub 2 at the end of the shaft of a spindle motor (not shown in the drawing) so as to be rotated. A magnetic head 3 records and reproduces information onto and from the magnetic disk 1 and is attached through a support spring 3a to a swing arm 4 rotatably supported on a pivot 5. One end of a band 6 is coupled to the swing arm 4. A capstan 7 is secured to the shaft 8 of a step motor not shown in the drawing. The band 6 is wound on the capstan 7 so as to be moved to turn the swing arm 4. The spindle motor for the hub 2, the pivot 5 and the step motor for the capstan 7 are attached to the upper plate of a box-shaped base 9 whose bottom is open.

A data track is circularly provided on the top of the magnetic disk 1 which is rotated at high speed. The capstan 7 is rotated so that the swing arm 4 is turned through the band 6. After the magnetic head 3 is positioned over a desired part of the data track, the rotation of the capstan is stopped.

Such a conventional magnetic disk device is usually required to operate properly despite an ambient temperature change of 40° to 50° C. However, it is likely that the components of the device are thermally deformed due to thermal expansion or contraction under the ambient temperature change. In that case, the magnetic head 3 of the device and the data track on the magnetic disk 1 thereof go out of a prescribed positional relation to each other, namely, the magnetic head and the data track deviate from each other so that information cannot be properly recorded and reproduced onto and from the magnetic disk.

The material of each component of the conventional magnetic disk device is usually as follows:

The magnetic disk 1 is made of pure aluminum. The magnetic head support spring 3a is made of a stainless steel. The band 6 is made of a stainless steel. The swing arm 4 is made of an aluminum alloy. The base 9 is made of an aluminum alloy. The capstan 7 is made of a stainless steel or an aluminum alloy.

Since the materials of the components of the magnetic disk device differ from each other as mentioned above, the quantities of thermal deformation of the components also differ from each other so that the magnetic head and the data track deviate from each other. The cause of the deviation is that the coefficients of thermal expansion of the stainless steel, the aluminum alloy and the pure aluminum as the materials of the components differ from each other in the order of (stainless steel)<(aluminum alloy)<(pure aluminum). It is practically very difficult to change the materials of the magnetic disk 1, the magnetic head support springs 3a and the band 6. For that reason, the base 9 is conventionally made of the aluminum alloy of 14 to 16% by weight in silicon content to decrease the coefficient of thermal expansion of the base so that the deviation between the magnetic head 3 and the data track is reduced.

However, since the silicon content of the aluminum alloy of the base 9 is 14 to 16% by weight, which is larger than that (12% or less by weight) of an ordinary aluminum alloy, the cost of the material of the base is high and the hardness of the material is so high as to deteriorate the working property of the material. For that reason, there is a problem that the material cost and the working cost of the base 9, which has the largest volume in all components of the magnetic disk device and has a large worked surface area, are very expensive.

Further, since the quantity of the deviation between the magnetic head and the data track depends on the combination of the materials of the components in the magnetic disk device, there is another problem that the quantity of the deviation is not necessarily reduced even if the base 9 is made of a material having a small coefficient of thermal expansion.

SUMMARY OF THE INVENTION

The present invention was made in order to solve the above-mentioned problems.

Accordingly, it is an object of the present invention to provide a magnetic disk device in which the material of the base having a large volume and worked surface area is inexpensive and is superior in the working property, and in which the quantity of the deviation between the magnetic head and the data track is small.

In the magnetic disk device of the present invention, a swing arm is made of an aluminum alloy whose silicon content is $16\pm1\%$ by weight and the base is made of a die-cast aluminum alloy whose silicon content is 7.5 to 9.5% by weight.

The combination of the swing arm, whose coefficient of thermal expansion is decreased by making the swing arm of the aluminum alloy, and the base reduces the quantity of the deviation between the magnetic head and the data track. Further, since the worked surface area of the swing arm is small, the increase in the cost of working the swing arm is slight compared to the working cost of the whole device although the working property of the swing arm is relatively poor. Besides, the swing arm weighs low and does not become expensive. Also, the cost of the material for the base is low and the working property thereof is good enough to diminish the cost of working thereof.

DETAILED DESCRIPTION OF THE PREFERRED EMBODIMENT

An embodiment of the present invention will be hereafter described in detail with reference to the drawings attached hereto.

Figure 1:
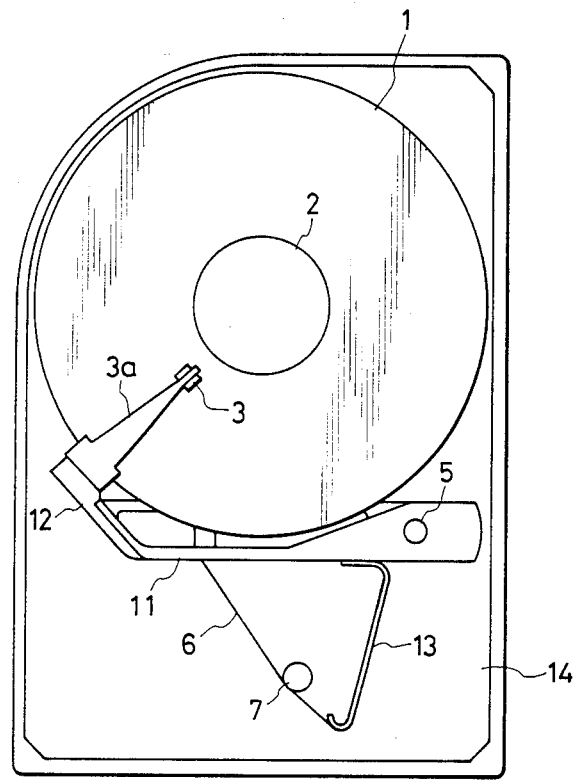
FIG. 1 is a plan view of a magnetic disk device which is an embodiment of the present invention.
Figure 2:
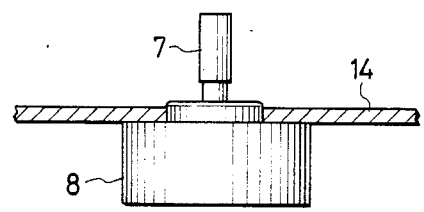
FIG. 2 is a sectional view of the capstan of the magnetic disk device of FIG. 1 and the vicinity of the capstan.

FIG. 1 is a plan view of a magnetic disk device according to the embodiment. A magnetic disk 1 is fitted to a hub 2 attached to the shaft (not shown in the drawing) of a spindle motor(not shown in the drawing), so that the magnetic disk is rotated. A magnetic head 3 is attached to a magnetic head support spring 3a made of a stainless steel. A swing arm 11 is rotatably supported on a pivot 5 and bears the support spring 3a through a support member 12. The swing arm 11 is made of an aluminum alloy whose silicon content is 16±1% by weight, so that the coefficient of thermal expansion of the swing arm is decreased. A spring plate 13 is attached to the swing arm 11 near the pivot 5. A band 6 is wound on a capstan 7. One end of the band 6 is secured to the tip of the spring plate 13 and the other end of the band is secured to the swing arm 11 near the tip thereof. The band 6 is made of a stainless steel. A box-shaped base 14 is made of a die-cast aluminum alloy of 7.5 to 9.5% by weight in silicon content such as the alloy of ADC 10 (Japanese Industrial Standard). The bottom of the base 14 is open. The spindle motor for the hub 2, the pivot 5 and a step motor 8(shown in FIG. 2) for the capstan 7 are attached to the upper plater of the base 14. As shown in FIG. 2, the capstan 7 is secured to the end of the shaft of the step motor 8 attached to the upper plate of the base 14.

The operation of the magnetic disk device is the same as that of the above-described conventional magnetic disk device. The magnetic disk 1 is rapidly rotated by the spindle motor. The capstan 7 is rotated by the step motor 8 to turn the swing arm 11 through the action of the band 6 and to position the magnetic head 3 over a desired part of a data track on the magnetic disk 1. After the magnetic head 3 is positioned over the desired part of the data track, the rotation of the capstan 7 is stopped.

The materials of the components of the magnetic disk device are the same as those of the components of the above-described conventional magnetic disk device except those of the swing arm 11 and the base 14. The quantity of the deviation between the magnetic head 3 and the data track can be most effectively reduced by making the swing arm 11 or the base 14 of the material whose coefficient of thermal expansion is small.

In the embodiment, the base 14 is made of the die-cast aluminum alloy of 7.5 to 9.5% by weight in silicon content to diminish the material cost of the base and to improve the working property for the large worked surface area. The swing arm 11 is made of the aluminum alloy of 16±1% by weight in silicon content to render the thermal deformation thereof smaller than that of a swing arm made of an ordinary aluminum alloy. As a result, the quantity of the deviation between the magnetic head 3 and the data track on the magnetic disk 1 is reduced.

Figure 3:
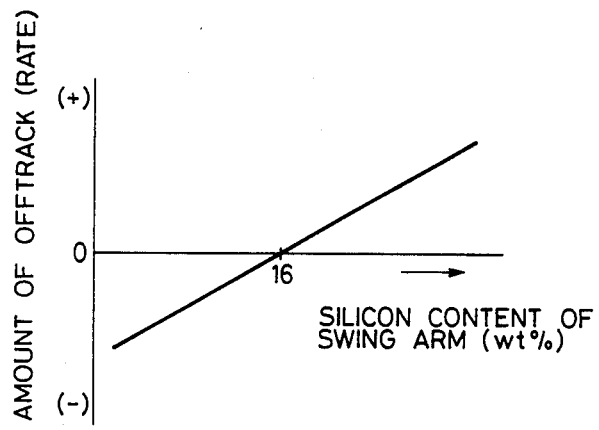
FIG. 3 is a diagram indicating the rate of the change in the quantity of deviation between the magnetic head and data track of the magnetic disk device, along with the change in the silicon content of the swing arm shown in FIG. 1.
Figure 4:
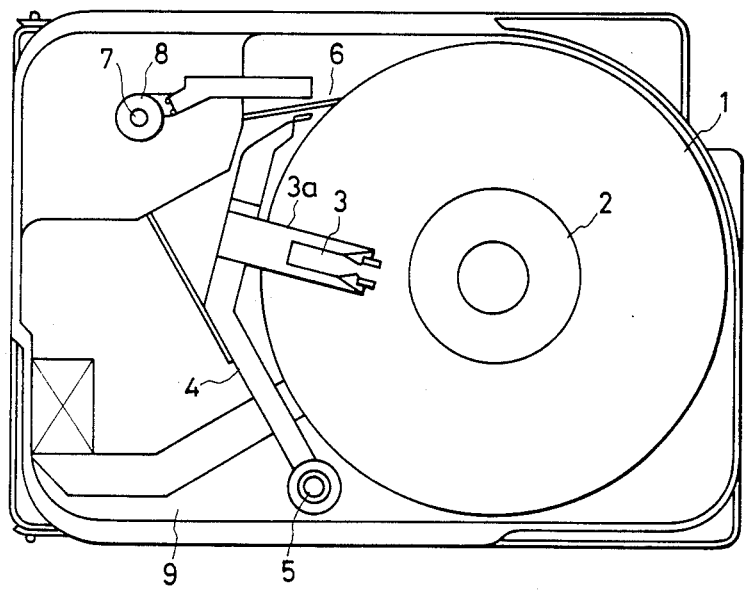
FIG. 4 is a plan view of a conventional magnetic disk device.

FIG. 3 is a diagram indicating the change in the quantity of the deviation when the silicon content of the aluminum alloy of the swing arm 11, which is combined with the base 14 made of the above material, is changed. In FIG. 3, a plus sign + denotes the outward deviation of the magnetic head 3 relative to the data track in the radial direction of the magnetic disk 1, and a minus sign − denotes the inward deviation of the magnetic head relative to the date track in the radial direction of the magnetic disk.

As described above,.according to the present invention, the swing arm is made of the aluminum alloy of 16±1% by weight in silicon content, and the base is made of the die-cast aluminum alloy of 7.5 to 9.5% by weight in silicon content. Accordingly, the material cost and the working cost of the base are reduced. Also, the deviation between the magnetic head and the data track is reduced.

What is claimed is:

1. In a magnetic disk device of the type comprising a box-shaped base made of an aluminum alloy, a spindle motor attached to an upper plate of said base to rotate a magnetic disk through a hub, a swing arm made of an aluminum alloy and rotatably support at one end thereof on a pivot attached to the upper plate of said, a magnetic head supported at a tip of said swing arm so as to be positioned over a data track of said magnetic disk, a capstan rotated by a stepper motor attached to the upper plate of said base, and a band coupled to said capstan and to said swing so as to turn said swing arm through the rotation of said capstan, the improvement characterized in that:

said swing arm is made of an aluminum alloy whose silicon content is 16±1% weight; and
said base is made of a die-cast aluminum alloy whose silicon content is 7.5 to 9.5% by weight.

* * * * *